United States Patent [19]
Lyon

[11] Patent Number: 5,234,034
[45] Date of Patent: Aug. 10, 1993

[54] PNEUMATIC PLUG DEVICE

[75] Inventor: David L. Lyon, Buffalo, Minn.

[73] Assignee: Cherne Industries Incorporated, Minneapolis, Minn.

[21] Appl. No.: 913,017

[22] Filed: Jul. 14, 1992

Related U.S. Application Data

[63] Continuation of Ser. No. 707,587, May 30, 1991, abandoned.

[51] Int. Cl.⁵ .................... F16L 55/12; F16L 55/10
[52] U.S. Cl. .................................. 138/93; 138/94
[58] Field of Search .............. 73/49.1, 49.5, 49.8; 220/232, 239; 4/295, DIG. 7; 134/167 C; 138/93, 96, 97, 94

[56] References Cited

U.S. PATENT DOCUMENTS

| | | | |
|---|---|---|---|
| 4,021,265 | 5/1977 | Guenther | 138/93 |
| 4,079,755 | 3/1978 | Uandorlans | 138/93 |
| 4,377,945 | 3/1983 | Digrovanni | 138/97 |
| 4,423,754 | 1/1984 | Carter | 138/93 |
| 4,460,019 | 7/1984 | Condon | 73/49.1 |
| 4,614,206 | 9/1986 | Mathison | 138/93 |
| 4,660,603 | 4/1987 | Tash | 138/93 |
| 4,713,870 | 12/1987 | Szaluay | 138/97 |
| 4,781,249 | 11/1988 | Wood | 166/187 |
| 4,790,356 | 12/1988 | Tash | 138/93 |
| 4,887,931 | 12/1989 | Frisby | 138/93 |
| 4,895,178 | 1/1990 | McHugh | 134/167 C |
| 4,967,846 | 11/1990 | Wood | 166/387 |

FOREIGN PATENT DOCUMENTS 1511812  5/1978  United Kingdom .................. 138/93

Primary Examiner—Harvey C. Hornsby
Assistant Examiner—Terrence R. Till
Attorney, Agent, or Firm—Anthony G. Eggink; Joel D. Skinner

[57] ABSTRACT

An elongated pneumatic plug is provided for sealing pipelines. The pneumatic plug has a body structure with a first end cap element, a second end cap element and an expandable elastomeric sleeve with a fixed outer diameter. A fluid ingress and egress valve is located in the first end element which is positioned adjacent the first segment of the sleeve structure. The elastomeric sleeve structure has a specified length and varying wall thicknesses at specified segments along its length. The segmented lengths comprise a middle segment having a predetermined wall thickness, a first segment having a thickness in a range of approximately 50-65% of the middle segment thickness and a second segment having a thickness in a range of approximately 65-80% of the middle segment thickness. The segmented sleeve structure provides an ordered and staged inflation and deflation of the pneumatic plug body.

17 Claims, 4 Drawing Sheets

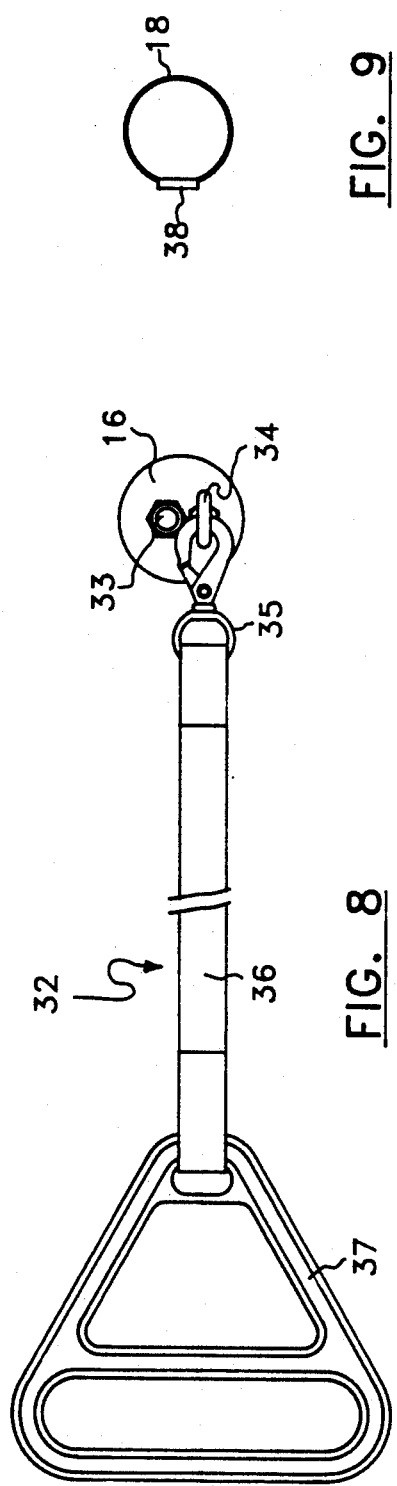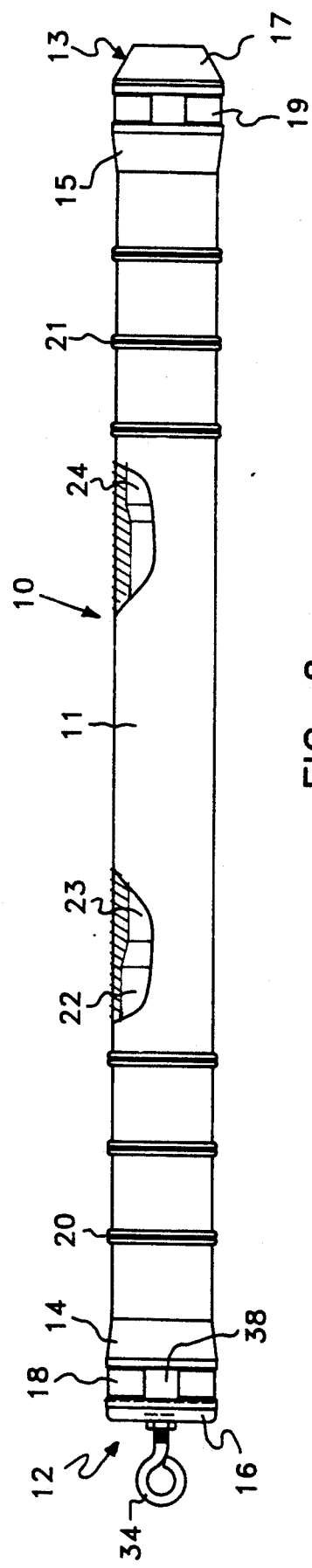

PNEUMATIC PLUG DEVICE

This is a continuation of application Ser. No. 07/707,587, filed on May 30, 1991, abandoned.

BACKGROUND OF THE INVENTION

This invention relates generally to pneumatic plug devices and, particularly, to elongated, multi-sized expansible pneumatic plugs used for sealing the interior of a range of pipeline diameters. More particularly, the elongated pneumatic plugs of this invention are provided with elastomeric sleeve structures that result in the ordered and staged inflation and deflation of the pneumatic plugs.

Pneumatic plugs are used in the construction and plumbing industries to seal pipelines and conduits for repair, installation and testing purposes. The type of plug used, whether mechanical or pneumatic in operation, depends upon the pipeline sealing requirements and the structure of the pipeline or pipeline connections. For example, wye or tee connections may require that two interconnected pipes be sealed simultaneously. For these purposes, elongated pneumatic plug devices are commonly used.

In the past, several configurations of elongated pneumatic plug devices have been proposed or utilized for sealing pipeline structures. Typically, these pneumatic plug devices have included expandable sleeve structures having a constant outside diameter and generally uniform wall thicknesses. Others have used sleeve structures that define a pair of opposing and readily larger end sections wherein generally two varying wall thicknesses are used as disclosed, for example, in U.S. Pat. No. 4,660,603. The latter structure was subsequently improved by the pipe plug device of U.S. Pat. No. 4,790,356 wherein a sleeve structure having a constant outside diameter is disclosed having a uniformly tapered side wall thickness. Still other plug devices have been used wherein two separate pneumatic plug devices are interconnected by a semi-rigid conduit.

The problem to be overcome by these prior art structures is the provision of two separate sealing elements which respectively engage to seal two separate pipe sections. Further, it is preferable that the middle component or section, which is unsupported during use, be protected by undergoing the least amount of inflation. Still further, it is desired that the expandable end elements or sections be controllable with respect to the order of inflation and deflation. And, although the prior art devices have attempted to provide an ordered and staged inflation and deflation of their respective end elements, while protecting the unsupported middle section, problems and limitations remain.

It is the object of this invention to provide an elongated pneumatic pipe plug having an elastomeric sleeve that results in the ordered and staged inflation and deflation of the plug body while protecting the unsupported middle portion of the sleeve during use. It is a further object of this invention to provide a pneumatic pipe plug exhibiting such functional parameters and which is economical and able to be manufactured in a reliable manner.

SUMMARY OF THE INVENTION

The invention provides an elongated pneumatic plug for sealing pipelines. The pneumatic plug has a body structure with a first end cap element, a second end cap element, and an expandable elastomeric sleeve with a fixed outer diameter. The elastomeric sleeve is an elongated cylindrical sleeve structure having a specified length and varying wall thicknesses at specified segments along its length to provide for the ordered and staged inflation and deflation of the pipe plug. The varying sleeve wall thicknesses are segmented along the sleeve length in three segmented lengths. These segments comprise a middle segment having a predetermined wall thickness, a first segment having a thickness in a range of approximately 50-65% of the middle segment thickness and a second segment having a thickness in a range of approximately 65-80% of the middle segment thickness.

The first end cap has fluid ingress and egress means, and is positioned adjacent the first segment of the sleeve structure. The second end cap has pressure relief means incorporated therein. The end cap elements each have circumferential grooves and the electromeric sleeve has sleeve ends each having an interiorly disposed circumferential rib for matingly engaging the corresponding end element groove. Clamping elements are provided on the exterior of the sleeve ends to secure the end caps therein. The sleeve structure further has at least one external circumferential rib disposed about each of the first and second segments. The rib is further comprised of a double elliptoidal configuration. The first end element further has a restricted orifice therein in communication with fluid ingress and egress means.

These and other benefits of this invention will become clear from the following description by reference to the drawings.

BRIEF DESCRIPTION OF THE DRAWINGS

FIG. 2 is a lateral plan view of the pneumatic plug device in its unexpanded state;

FIG. 8 is a top view of the retaining structure of the plug device; and

FIG. 9 is a lateral view of the fastener clamp used to secure the end caps in the sleeve structure ends.

DESCRIPTION OF THE PREFERRED EMBODIMENTS

Figure 1:
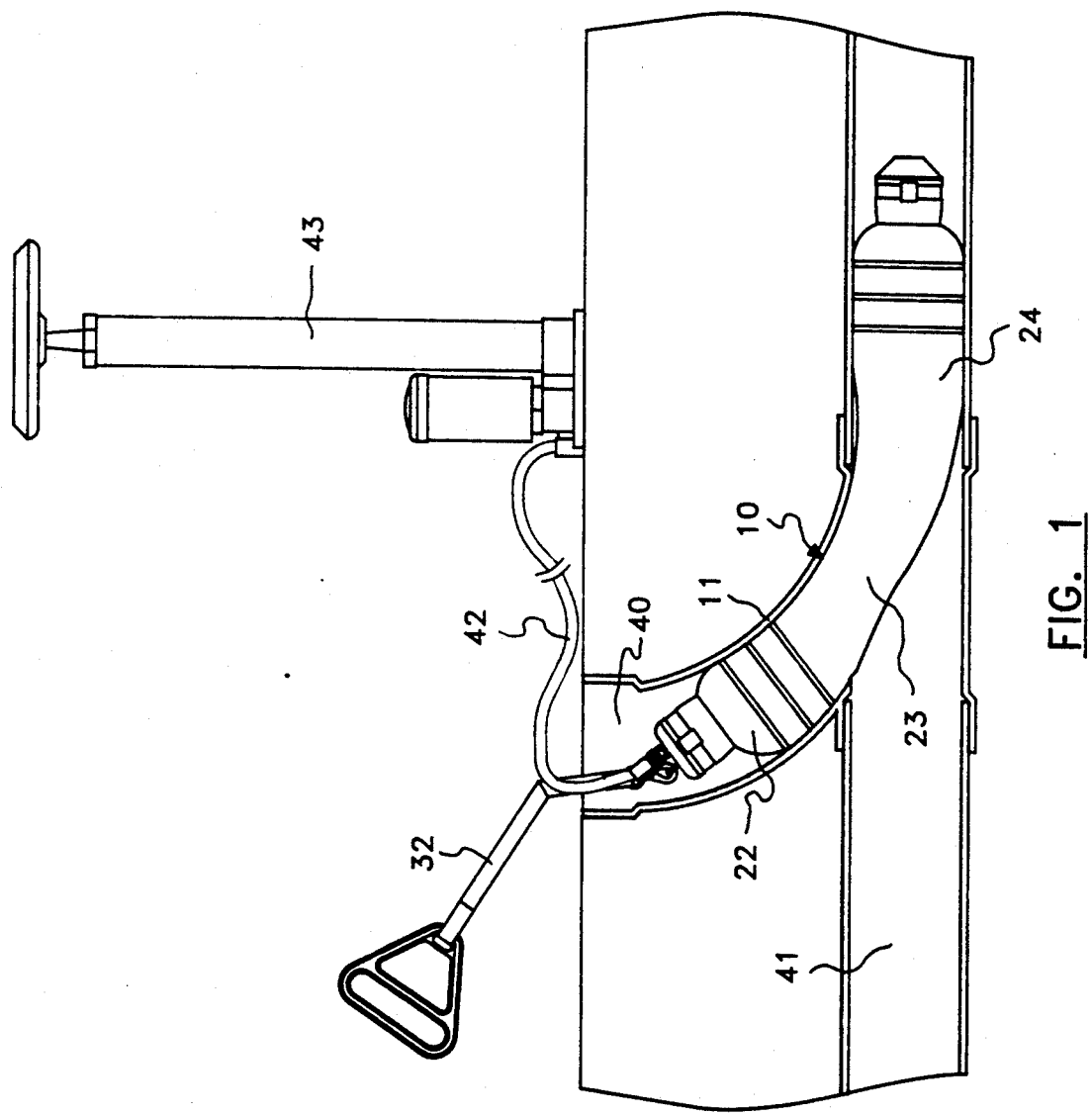
FIG. 1 is a lateral plan view of the pneumatic plug device of this invention and showing the device in an operable expanded state in a pipeline structure.

FIG. 1 shows the multi-stage pneumatic plug 10 installed in a pipeline network, such as one comprising an access pipe 40 for cleaning and inspection. The access pipe 40 is shown connected to a building sewer pipe 41. The pneumatic plug 10 is shown to be inflated by means of a hand operable pump 43 connected by extension hose 42, i.e. a five foot long removable hose. A retaining structure 32 is shown attached to the pneumatic plug 10 for the plug's retrieval from the pipeline after deflation.

The multi-stage plug 10 is shown having three distinct body portions, namely, top end portion 22, middle portion 23, and bottom end portion 24. The top end 22 is shown expanded into pipe 40, bottom end 24 is expanded into pipe 41 and middle portion 23 is relatively unexpanded and in an unsupported state. Because it is often desired to seal both pipes 40 and 41 and also to seal and unseal the respective pipes in a specific order, i.e., permit flow in pipe 41 by deflating bottom end portion 24 then deflating top end portion 22 for plug 10 removal, it is necessary to control the expansion and deflation of specific sleeve body 11 segments of the pneumatic plug 10.

FIG. 2 shows the pneumatic plug 10 having a sleeve body 11 with a top cap assembly 12 and a bottom cap assembly 13 installed at the top sleeve end 14 and bottom sleeve end 15, respectively. The sleeve ends 14 and 15 and end cap bodies 16 and 17 are constructed and arranged in a mating configuration which are secured by circumferential exterior clamps 18 and 19. Importantly, between sleeve ends 14 and 15, the sleeve body 11 is divided into three portions or segments 22, 23, and 24. The top and bottom end portions 22 and 24 have ribs 20 and 21 which are circumferentially molded from the sleeve body 11.

Figure 3:
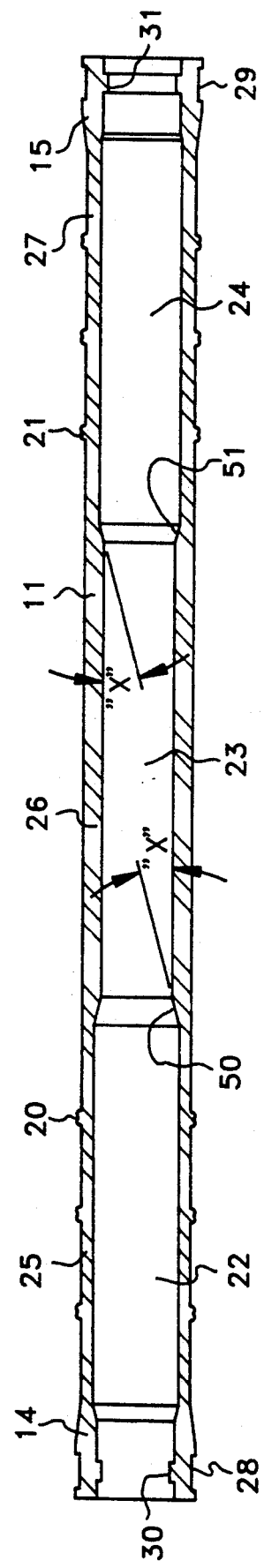
FIG. 3 is a cross-sectional view of the sleeve structure of the pneumatic plug device.

FIG. 3 illustrates a sectional view of the sleeve body 11 and which shows the varying sleeve thicknesses as top end thickness 25, middle portion thickness 26, and bottom end thickness 27. As shown, the sleeve body 11 between sleeve ends 14 and 15 has the greatest thickness at its middle region thickness 26, with the bottom end thickness 27 being the next greatest and the top end thickness 25 being the relative thinnest.

The pneumatic plug 10 and the sleeve body 11 shown in FIGS. 2 and 3 represents an elongated plug and sleeve structure that provide the ordered and staged inflation of this invention. Pneumatic plugs 10 are preferably provided in sizes (length and outside diameter) to seal a range of pipeline diameters, i.e., 2-3 inch, 3-4 inch, and 4-6 inch diameter pipes. Accordingly, the relative lengths and outside diameters of the pneumatic plugs 10 also vary. However, for purposes of providing the ordered and staged inflation and deflation of the sleeve body 11 segments, certain parameters have been found necessary to achieve these desired results, primarily, the deflation of bottom end portion 24 before the deflation of top end portion 22 and the minimal inflation of middle portion 23 which is unsupported during the plug use.

With respect to the relative wall thickness of the sleeve body 11, the sleeve body length between the top and bottom cap assemblies 12 and 13 is shown to have three different and uniform wall thicknesses. For example, wall thickness 26 of the middle portion, which represents the unsupported segment of the sleeve body 11, has the greatest thickness. The wall thickness 27 of the bottom end portion 24 is preferably 65-80% of the middle portion thickness 26 and portion 25 is preferably 50-65% of the middle portion thickness 26. Thus, the three separate sleeve segments are distinct from one another, each having a uniform thickness and the top end portion having a thinner wall thickness than the bottom end portion while both end portions are thinner than the middle portion.

With respect to the relative lengths of the three separate sleeve segments, FIG. 3 shows them to be generally equal in length, however, it has been found that it is primarily important for the top and bottom end portions to be generally of equal length Generally, the middle or unsupported portion has a length longer than the end portions. For example, the end portion lengths may be 50 to 90% of the middle portion length.

The segmented lengths are further shown to be united by sloped or frustoconical segments 50 and 51 which unite sleeve end portions 22, 23 and 23, 24, respectively. The sloped segments are provided so that concentrated areas of stress or forces in the sleeve structure are minimized. For the multisized plugs shown and discussed, a slope "x" in the range of 10-25 degrees is suitable and a slope of approximately 15 degrees has been found preferable. Other transition configurations, such as rounded or curved walled segments may be used although the sloped segments are preferred.

The sleeve body 11 is preferably molded of an elastomeric material, such as rubber, and which has properties including a Shore A durometer reading of 50-65, a minimum tensile strength of 2300 psi, and a minimum elongation at break of 500%.

Figure 5:
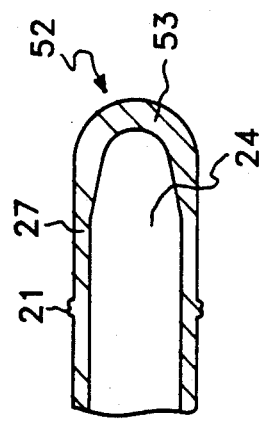
FIG. 5 is a partial sectional view of an alternate embodiment of the sleeve structure bottom end.

FIG. 5 shows an alternative sleeve bottom end 52 for the pneumatic plug sleeve. Although a bottom end cap 13 is shown used in FIG. 2, the end cap 13 is not essential to the function of the pneumatic plug 10. It is, therefore, within the purview of this invention to provide a pneumatic plug having a sleeve structure as described herein but having a closed and thickened wall end 53. In the latter configuration of FIG. 5, the top end cap 12 is secured in the top end of the sleeve structure 11, and the three distinct wall thickness portions according to the teachings of this invention are operative as discussed.

Figure 6:
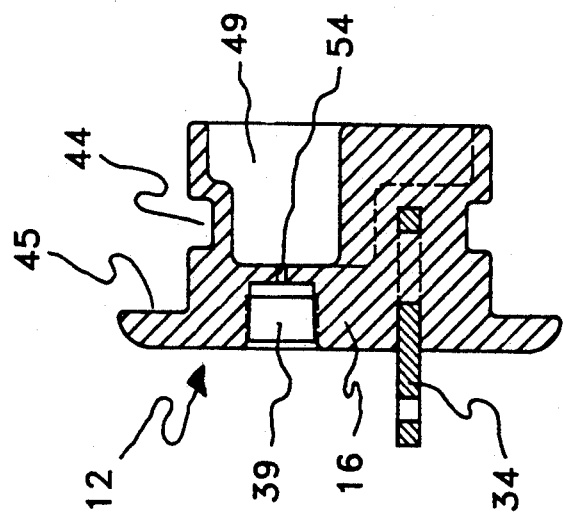
FIG. 6 is a cross-sectional view of the top end cap of the pneumatic plug device.

FIG. 6 shows a sectional view of the top cap assembly 12 having a generally T-shaped body structure 16. The cap assembly 12 further has a threaded aperture 39 for the inflator and deflator valve 33 (FIG. 8) or, alternatively, the placement of aperture 39 can be used for other pressurized fluids, such as a water inlet. An eye bolt 34 is provided for the attachment of a retaining and handling structure 32 (FIG. 8). The top cap body 16 further has an inner lip 45 and circumferential groove 44 for receiving the mating top sleeve end 14 as shown in FIG. 2. Opposite and in contact with the valve aperture 39, a restricted orifice 54 is provided which has been found to be beneficial in the inflation and expansion control of the multi-stage plug, particularly when utilizing standard air valves and using standard 80 p.s.i. compressed air sources. The restricted orifice 54 limits the flow of compressed fluid between the inflater valve 33 and the passage 49 into sleeve 11. The restricted orifice preferably has a diameter ranging from 0.030 to 0.060 inches. The restricted orifice 54, therefore, restricts or limits the rate of inflation and deflation of the sleeve 11.

Figure 7:
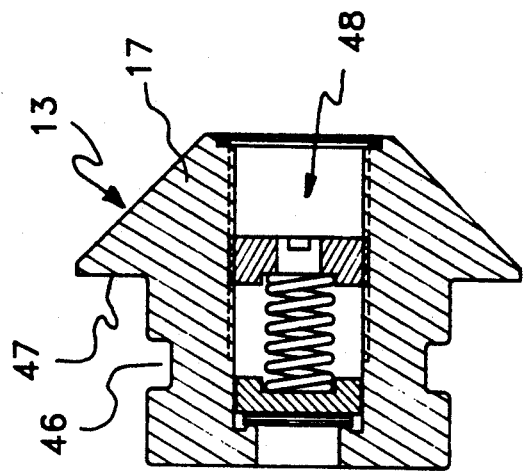
FIG. 7 is a cross-sectional view of the bottom end cap of the plug device.

FIG. 7 shows a sectional view of the bottom cap assembly 13 having a sloped T-shaped body 17. The bottom cap body 17 further has an inner lip 47 and circumferential groove 46 for receiving the mating bottom sleeve end 15, as shown in FIG. 2. The top and bottom end cap bodies 16 and 17 are preferably molded of a plastic composition, such as ABS.

The cap assembly 13 is further shown to have an adjustable valve assembly 48 and which is the subject matter of the present assignee's U.S. patent application Ser. No. 07/666,347, filed on Mar. 8, 1991 and entitled, Pressure Relief Valve Assembly. As disclosed in that Application, the pressure relief valve is adjustable to set the operating parameters of the valve structure. For purposes of the present invention, the cracking pressure of the valve can be preset at 50-55 psig, for example.

FIG. 8 shows the retaining structure 32 having a fastening clasp 35 connected to one end of strap 32 and a handle member 37 connected to the opposite end of strap 32. The clasp 35 is further shown attached to the eye bolt 34 of top cap body 16. The retaining structure 32 is used by the plumber to carry the pneumatic plug and is provided primarily for ensuring that the plug 10 is not carried into pipe 41 when the plug 10 is being deflated after use. The handle 37 is provided for hand gripping so that the plug 10 can be held and pulled from the pipeline network after use. The handle 37 has dimensions that are larger than the pipeline diameter to prevent the plug assembly 10 from being pulled into the pipeline through the access pipe 40 during deflation of the plug.

Figure 4:
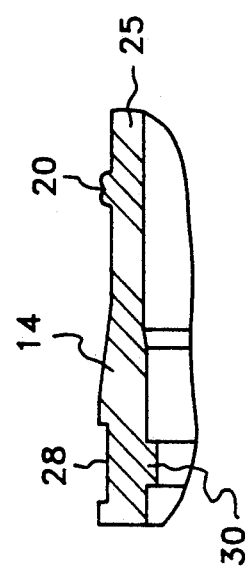
FIG. 4 is a partial sectional view showing an enlargement of the sleeve structure top end.

FIG. 9 shows the clamp structure 18 having a fastener member 38 that is used to secure the clamp 18 in a tight configuration about the top sleeve end 14 as shown in FIG. 2. The clamp 18 is positioned in top end groove 28, as shown in FIG. 4. The groove 28 is positioned directly above top end inner rib 30 which fits into the circumferential groove 44 of top cap body 16, as shown in FIG. 6. In a similar manner, clamp structure 19 is used with respect to bottom sleeve end 15 and bottom cap body 17.

As many changes are possible to the embodiments of this invention by utilizing the teachings thereof, the description above and the accompanying drawings should be interpreted in the illustrative and not the limited sense.

That which is claimed is:

1. A pneumatic plug for sealing separate pipeline segments comprising:
   a) a first end element having pressurized fluid ingress and egress means and further having a restricted orifice adjacent and communicating with said fluid ingress and egress means, said restricted orifice further having a diameter ranging between 0.030 and 0.060 inches to limit the rate of inflation of said pneumatic plug,
   b) a homogeneous elastomeric sleeve structure having a generally uniform outside diameter, a length and being constructed and arranged to provide for the ordered and staged inflation and deflation of the pneumatic plug, said sleeve structure further comprising,
      i. a first end portion for receiving said first end element, and
      ii. a variable wall thickness along said sleeve length having three predetermined uniform thicknesses defined by a first end segment, a middle segment and a second end segment, said middle segment being primarily unsupported during plug use and having the greatest thickness, and said second end segment having a greater thickness than said first end segment thickness, said first end, middle and second end segments being distinct from each other, and
   c) means to fasten said first end element in said first end segment of said sleeve structure, whereby the ingress and egress of pressurized fluid results in the ordered and staged inflation and deflation of said first end segment and said second end segment with respect to said middle segment.

2. The pneumatic plug of claim 1, wherein said sleeve first end segment, said middle segment and said second end segment each have a length of approximately one third of said sleeve structure length.

3. The pneumatic plug of claim 1, wherein said sleeve first end segment has a wall thickness in a range of approximately 50-65% of said middle segment wall thickness and wherein said sleeve second end segment has a wall thickness in a range of approximately 65-80% of said middle segment wall thickness.

4. The pneumatic plug of claim 1, wherein said plug has a second end element and fastening means to unite said second element in said sleeve second end segment.

5. The pneumatic plug of claim 4, wherein said second end element has pressure relief means therein.

6. The pneumatic plug of claim 1, wherein said end element has a circumferential groove, wherein said sleeve first end portion has an interiorly disposed circumferential rib for matingly engaging said end element groove and wherein said means to fasten is a clamp.

7. The pneumatic plug of claim 1, wherein said sleeve first end segment and said middle segment and wherein said middle segment and said second end segment having transition areas therebetween that are sloped.

8. The pneumatic plug of claim 7, wherein said sloped transition between said sleeve segments are within a range of 10-25 degrees with respect to an axis parallel said sleeve length.

9. The pneumatic plug of claim 1, wherein said sleeve structure has outer circumferential ribs disposed on said first and second end segments.

10. In an elongated pneumatic plug for sealing pipelines having a body structure with a first end cap element, a second end cap element, and an expandable elastomeric sleeve with a fixed outer diameter mounted therebetween, said elastomeric sleeve structure comprising:
    a) an elongated cylindrical, homogeneous and unitary sleeve having a length and varying wall thicknesses at specified segments along said length to provide for the ordered and staged inflation and deflation of said pipe plug;
    b) said varying wall thickness of said sleeve being segmented along said sleeve length in three separate and distinct segmented lengths, said segmented lengths being approximately equal in length to each other and further comprising a middle segment having a predetermined and uniform wall thickness, a first segment having a uniform thickness in a range of approximately 50-65% of said middle thickness and a second segment having a uniform thickness in a range of approximately 65-80% of said middle segment thickness; and
    c) fluid ingress and egress means located in said first end element, said first end element further having a restricted orifice therethrough in communication with said fluid ingress and egress means and being positioned adjacent to said first segment of said sleeve structure, said restricted orifice for limiting the rate of inflation of said elastomeric sleeve.

11. The pneumatic plug of claim 10, wherein said end cap elements each have circumferential grooves and wherein said elastomeric sleeve has sleeve ends each having an interiorly disposed circumferential rib for matingly engaging said corresponding end element groove and further wherein clamping means are provided on the exterior of said sleeve ends to maintain said end caps therein.

12. The pneumatic plug of claim 10, wherein said second end cap has pressure relief means incorporated therein.

13. The pneumatic plug of claim 12, wherein said pressure relief means is a pressure relief valve.

14. The pneumatic plug of claim 10, wherein said sleeve structure has sloped transition areas between said first segment and said middle segment and between said middle segment and said second segment.

15. The pneumatic plug of claim 10, wherein said sleeve structure has at least one external circumferential rib disposed about each said first and second segments.

16. The pneumatic plug of claim 15, wherein said rib is further comprised of a double elliptoidal configuration.

17. A pneumatic plug for sealing different pipeline segments comprising first and second end elements each being of a circular configuration and having an outer circumferential groove, said first end element having fluid ingress and egress means and said second end element having pressure relief means mounted therein, an elongated elastomeric sleeve structure of a homogeneous composition and having a generally uniform outside diameter along its length, said sleeve structure having first and second end portions each having an interiorly disposed circumferential rib to matingly engage the circumferential groove of said first and second end elements, respectively, and a first and second circumferential clamp member securing said respective sleeve ends to said respective end elements, said sleeve structure further having at least three different, distinct and uniform wall thickness segments along its length, said segments comprising a first segment, a middle segment and a second segment, said middle segment having the greatest thickness and said second segment having a greater thickness than said first segment, said middle segment further having a length which is longer than the length of either said first or second segment, whereby the ingress and egress of pressurized fluid results in the ordered and staged inflation and deflation of the first, middle and second segments of the sleeve structure.

* * * * *